(12) United States Patent
Trepetin (10) Patent No.: US 7,933,909 B2
(45) Date of Patent: Apr. 26, 2011

(54) SYSTEMS AND METHODS FOR IMPROVING THE LINKAGE AND SECURITY OF RECORDS

(75) Inventor: Stanley Trepetin, New York, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 520 days.

(21) Appl. No.: 11/935,728

(22) Filed: Nov. 6, 2007

(65) Prior Publication Data

US 2008/0109459 A1 May 8, 2008

Related U.S. Application Data

(60) Provisional application No. 60/856,966, filed on Nov. 6, 2006.

(51) Int. Cl.
*G06F 17/30* (2006.01)
(52) U.S. Cl. ........ 707/755; 707/626; 707/756; 707/758; 714/704
(58) Field of Classification Search .................. None
See application file for complete search history.

(56) References Cited

U.S. PATENT DOCUMENTS

| | | | | |
|---|---|---|---|---|
| 7,315,826 | B1 * | 1/2008 | Guheen et al. | 705/7 |
| 7,403,901 | B1 * | 7/2008 | Carley et al. | 705/2 |
| 2005/0131922 | A1 * | 6/2005 | Kennedy et al. | 707/100 |

OTHER PUBLICATIONS

Stanley Trepetin, Privacy in Context: The Costs and Benefits of a New Deidentification Method, Jun. 2006, Massachusetts Institute of Technology, PhD Thesis, 1-153.*

* cited by examiner

*Primary Examiner* — Pierre M Vital
*Assistant Examiner* — Mohammad S Rostami
(74) *Attorney, Agent, or Firm* — Peter A. Nieves; Sheehan Phinney Bass + Green, PA (57) ABSTRACT

A system and method for improving the linkage and security of records is provided. Generally, the present invention can be viewed as providing methods for selecting an ideal identifier, from a series of test identifiers, for linking more than one associated record. In this regard, one embodiment of such a method, among others, can be broadly summarized by the following steps: accessing several parameters for each test identifier; determining if an error rate of the test identifier is an improved error rate over an error rate of an existing identifier; determining if the test identifier reduces linkage error; and selecting the test identifier as the ideal identifier if the test identifier has a lower overall error rate, as determined by the steps of determining if an error rate of the test identifier is an improved error rate over an error rate of an existing identifier and determining if the test identifier reduces linkage error, compared to other test identifiers.

14 Claims, 3 Drawing Sheets

SYSTEMS AND METHODS FOR IMPROVING THE LINKAGE AND SECURITY OF RECORDS

CROSS-REFERENCE TO RELATED APPLICATION

This application claims priority to copending U.S. Provisional Application entitled, "SYSTEMS AND METHODS FOR IMPROVING THE LINKAGE AND SECURITY OF RECORDS," having Ser. No. 60/856,966, filed Nov. 6, 2006, which is entirely incorporated herein by reference.

GOVERNMENT SUPPORT

This invention was made with government support under grant number N01 LM033515 awarded by the National Institutes of Health. The Government has certain rights in this invention.

FIELD OF THE INVENTION

The present invention is generally related to linkage and security of records, and more particularly is related to improvement of record linkage of data and security of such linkage.

BACKGROUND OF THE INVENTION

Numerous software applications in areas such as, but not limited to, public health, e-commerce, finance, and national security, link person-level or other entity level data, also referred to as records, to draw conclusions about people or effectiveness of organizations or public programs. Record linkage is the process of combining two or more records to link information relating to a single unit, such as an individual, a family, or an event. Numerous software applications utilize such a technique, often answering questions on relationships or effectiveness of the associated programs, people, or entities. For example, linking police records and court records is useful in answering questions such as which variables (such as, but not limited to, type of assault, and location of a break-in) affect severity of a prison sentence. Hospital discharge data can be linked to themselves to determine if the length of a newborn's postnatal hospital stay is related to his future hospital readmissions. The hypothesis may be that the shorter the hospital stay the more probable the readmission.

More effective data synthesis can lead to better decisions. As an example, a health insurance company trying to better protect the privacy of its internal data may use a predictive modeling (PM) application. A PM application is a software application used to identify individuals with chronic conditions, such as, but not limited to, diabetes or asthma. By successfully identifying chronically ill people, the insurer can enroll the chronically ill people in disease management programs that can improve their care and reduce their health services utilization, which should reduce the medical claims costs to the insurer due to less medical services use.

Unfortunately, today, not all people allow for their data to be used for PM due to privacy fears, such as, but not limited to, unknown secondary use of the data and "insider" data misuse. Also, at times, linkage variables used in PM systems have errors, undermining the data linkage and thus the identification of chronically ill policy-holders. Current literature discusses reasons why certain linkage variables appear more useful than others. Some literature even addresses the "information content" of a linkage variable and asks how beneficial it might be for linkage. However, current literature does not explain the tradeoffs between the errors of a field and linkage outcomes. It may be less clear how to overcome errors of a field in other linkage projects, which may or may not have similar traits to projects already examined.

In addition to the abovementioned, if linkage can also be done more securely, the privacy of the linked individuals can be better protected, engendering greater trust in and mitigating individual harm when using the software applications that depend on record linkage.

Thus, a heretofore unaddressed need exists in the industry to address the aforementioned deficiencies and inadequacies.

SUMMARY OF THE INVENTION

Embodiments of the present invention provide a system and method for improving linkage and security of records. Briefly described, the present invention can be viewed as providing methods for selecting an ideal identifier, from a series of test identifiers, for linking more than one associated record. In this regard, one embodiment of such a method, among others, can be broadly summarized by the following steps: accessing several parameters for each test identifier; determining if an error rate of the test identifier is an improved error rate over an error rate of an existing identifier; determining if the test identifier reduces linkage error; and selecting the test identifier as the ideal identifier if the test identifier has a lower overall error rate, as determined by the steps of determining if an error rate of the test identifier is an improved error rate over an error rate of an existing identifier and determining if the test identifier reduces linkage error, compared to the other test identifiers.

Other methods and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method provides a way to improve the record linkage of data and the security of such linkage. With more secure linkage, the privacy of the "linked" individuals can be better protected, engendering greater trust in and mitigating individual harm when using those software applications that rely upon record linkage. To address the abovementioned, the present invention first provides methods to better identify variables for improved record linkage. In particular, by selecting variables that have less errors and are more often unique for each person, records are better linked due to better linkage variable integrity. Second, the present invention improves the security of such record linkage. The present invention focuses on the ability to anonymize the linkage variables in such a manner as to securely preserve the ability to test equality of the variables—that is, their linkability—yet allow for the recognition of errors in the original strings post-anonymization.

For exemplary purposes only, and to provide an example of an environment for application of the present invention, the present description embodies the following exemplary environment. A health insurance company is trying to better protect the privacy of its internal data. The present system and method focuses on anonymizing the predictive modeling application of the insurer, which is a software application used to identify individuals with chronic conditions, such as diabetes or asthma. By successfully identifying chronically ill people, the insurer can enroll these people in disease management programs that can improve their care and reduce their health services utilization, which should reduce the medical claims costs to the insurer due to less medical services use. By anonymizing the data and resolving more errors, predictive modeling can better link the data and thus better identify chronically ill people, improving the outcomes for the policy-holders and the insurer alike.

Figure 1:
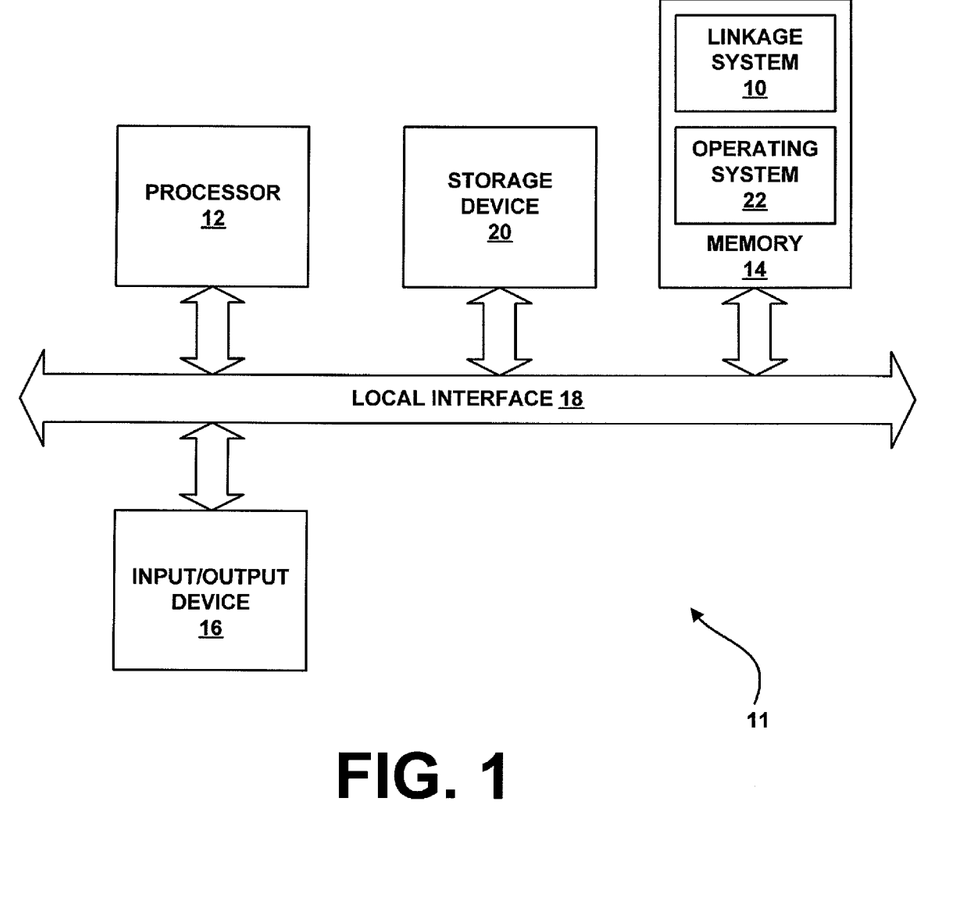
FIG. 1 is a schematic diagram illustrating an example of a general purpose computer that can implement the linkage system of the present invention.

The system of the present invention, also referred to here as a linkage system, can be implemented in software (e.g., firmware), hardware, or a combination thereof. In the currently contemplated best mode, the linkage system is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the linkage system of the present invention is shown in FIG. 1. In FIG. 1, the linkage system is denoted by reference numeral 10.

Generally, in terms of hardware architecture, as shown in FIG. 1, the computer 11 includes a processor 12, memory 14, and one or more input and/or output (I/O) devices 16 (or peripherals) that are communicatively coupled via a local interface 18. In addition, the computer 11 may contain a storage device 20, which may be stationary or removable. The local interface 18 can be, for example, but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface 18 may include address, control, and/or data connections to enable appropriate communications among the aforementioned components.

The processor 12 is a hardware device for executing software, particularly that stored in the memory 14. The processor 12 can be any custom made or commercially available processor, a central processing unit (CPU), an auxiliary processor among several processors associated with the computer 11, a semiconductor based microprocessor (in the form of a microchip or chip set), a macroprocessor, or generally any device for executing software instructions. The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software in memory 14 may include one or more separate programs, each of which comprises an ordered listing of executable instructions for implementing logical functions. In the example of FIG. 1, the software in the memory 14 includes the linkage system 10 in accordance with the present invention. The software in the memory 14 may also contain a suitable operating system (O/S) 22. The operating system 22 essentially controls the execution of other computer programs, such as the linkage system 10, and provides scheduling, input-output control, file and data management, memory management, and communication control and related services.

The linkage system 10 is a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, the linkage system 10 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 16 may include input devices, for example but not limited to, a keyboard, mouse, scanner, microphone, etc. Furthermore, the I/O devices 16 may also include output devices, for example, but not limited to, a printer, display, etc. Finally, the I/O devices 16 may further include devices that communicate both inputs and outputs, for instance, but not limited to, a modulator/demodulator (modem; for accessing another device, system, or network), a radio frequency (RF) or other transceiver, a telephonic interface, a bridge, a router, etc.

If the computer 11 is a PC, workstation, or the like, the software in the memory 14 may further include a basic input output system (BIOS) (omitted for simplicity). The BIOS is a set of essential software routines that initialize and test hardware at startup, start the O/S 22, and support the transfer of data among the hardware devices. The BIOS is stored in ROM so that the BIOS can be executed when the computer 11 is activated.

When the computer 11 is in operation, the processor 12 is configured to execute software stored within the memory 14, to communicate data to and from the memory 14, and to generally control operations of the computer 11 pursuant to the software. The linkage system 10 and the O/S 22, in whole or in part, but typically the latter, are read by the processor 12, perhaps buffered within the processor 12, and then executed.

When the linkage system 10 is implemented in software, as is shown in FIG. 1, it should be noted that the linkage system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The linkage system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the linkage system 10 is implemented in hardware, the linkage system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As previously mentioned, the present invention first provides methods to better identify variables for improved record linkage. The present invention also provides for securing linkage. This requires transforming a consistent linkage identifier into a secure identifier, which can also facilitate resolving errors in the original string and the overall application. The present invention provides an encryption-based approach to provide the abovementioned, where the method obfuscates linkage identifiers and facilitates their linkability, yet handles errors within the identifiers.

As is explained in detail below, the present linkage system and method allow for the locating of identifiers that can address the errors of linkage identifiers by obtaining additional data on which records should be linked. The system and method examines information content of linkage fields to reduce linkage errors. A user of the present system and method can decide whether to analyze and add one or more fields to overcome linkage identifier errors in their software. A threat model is provided that can be used to judge the privacy protection offered by an approach. This is a generic paradigm for evaluating application security within and outside of an original organization. For exemplary purposes, the present description focuses on a predictive modeling application—an internal application—, therefore, users of the present system and method can ask if an approach offers appropriate security if the data involved are produced by the same organization. If it is the same organization, more security would be necessary since employees might have access to internal data deidentification processes against which a security approach must protect. The present system and method provides a solution that meets the abovementioned threat model. It should also be noted, that the present system and method is even more secure when data are produced outside of an organization, in which case attackers have even less knowledge of how to attack the system or data.

With regard to the present system and method, the following describes a process for reducing identifier errors in applications linking records. In the belowmentioned, the purpose of record linkage and how likelihood ratios and linkage thresholds form the basis of distinguishing true from false links is first described. Next, such constructs are used in selecting fields within records that will provide optimum linkage.

Figure 2:
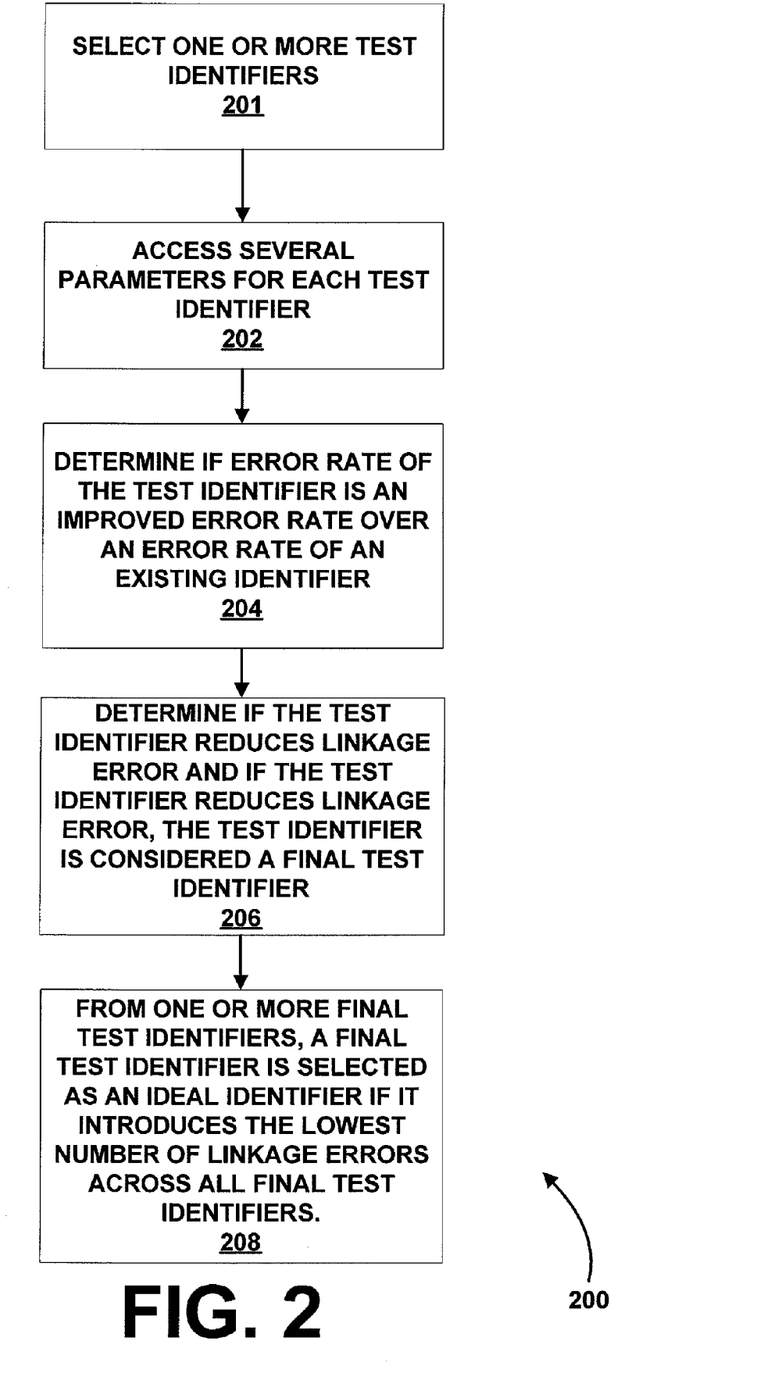
FIG. 2 is a flowchart illustrating a method of selecting linkage identifiers having less errors.

FIG. 2 is a flowchart 200 illustrating a method of selecting linkage identifiers having less errors, which is described in further detail hereinbelow. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

In accordance with the present invention, we start with a system that has one existing identifier and we want to understand if there are test identifiers that can be used to improve overall linkage. As is shown by block 201, one or more test identifiers is selected. As is shown by block 202, several parameters are accessed for each test identifier. A determination is then made as to whether the error rate of the test identifier is an improved error rate over an error of an existing identifier (block 204). As is shown by block 206, it is then determined if the test identifier reduces linkage error. If the error rate of the test identifier is an improved error rate over an error of an existing identifier and if the test identifier reduces linkage error, then the test identifier is considered a final test identifier. As is shown in block 208, from one or more final test identifiers, a final test identifier is selected as an ideal identifier if it introduces the lowest number of linkage errors across all final test identifiers.

As is known by those having ordinary skill in the art, record linkage is the process of combining two or more records to link information relating to a single unit, such as an individual, a family, or an event. When a unique identifier is unavailable for such linkage, however, because the identifier is in a different format, the identifier is not unique, or the identifier has errors, including missing values, more advanced techniques are required.

The purpose of record linkage is to determine which records represent matches and which represent non-matches in a file. As an example, a match will represent the case when the two records being compared represent the same unit, such as, but not limited to, the same person. Alternatively, a non-match represents the case when the two records represent two different units, such as, but not limited to, two different individuals. There are two steps involved in record linkage, namely, training and validation. Training configures the record linkage system for subsequent use. The system then uses the training parameters to run on actual, validated data. The present process for better identifying variables for improved record linkage focuses mostly on the training step. In accordance with the present invention, record linkage training parameters are optimized to improve validation operations.

In accordance with the present invention, a single file is linked to itself. It should be noted, however, that the present invention and analysis applies to applications that link two or more files, as is more common in record linkage. The fundamental computation behind record linkage is that of likelihood ratios, representing the odds that any two records represent the same unit. High likelihood ratio values imply a match, while low likelihood ratio values imply a non-match, as is shown in further detail below. Each training file record is linked with every other training file record. In the resulting cross product, the system determines if record $R_i$ and record $R_j$ represent a match for all i, j=1 ... N, where N is the number of records in the file. Patterns are used to identify matches, where patterns are questions about a comparison of the fields making up $R_i$ with the corresponding fields in record $R_j$ that are computed for every record pair. Almost any computation is possible. The pattern may be that two corresponding fields must agree exactly on their contents; the pattern may be that several corresponding fields should specifically disagree on their last 3 characters; or the pattern may be that two corresponding fields should be equal to "Jones."

Given observed patterns 1 through k, a likelihood ratio (LR) is formed during training. The computed LR is represented by equation 1 (Eq. 1).

$$LR = P(\text{pattern}_1, \ldots, \text{pattern}_k | R_i \text{ and } R_j \text{ match}) / P(\text{pattern}_1, \ldots, \text{pattern}_k | R_i \text{ and } R_j \text{ don't match}) \quad \text{(Eq. 1)}$$

The intent of training is to find patterns such that the LR created would properly designate the match status of $R_i$ and $R_j$ when the system actually observes the pattern during training. The present system distinguishes matching from non-matching records by separating high and low LRs. Useful patterns create LRs significantly different from 1. Otherwise, it would be difficult to distinguish whether the two records match upon observing the pattern. Equality, inequality, or partial equality of fields are patterns that may be used because they generate LRs significantly higher and lower than 1, respectively, allowing for the separation of matches versus non-matches, as is described in detail below.

Since the possible number of patterns involving all record fields is vast, one common assumption made in record linkage is that of conditional independence. The comparisons represented by patterns are assumed to be mutually independent conditioned on either records matching or not matching. For example, imagine two patterns: equality of the date of birth (DOB) field; and, equality of the street name field. Whether two records agree on DOB is assumed to be independent of whether they agree on the street name of the address if we know that the records match or do not match. Practically speaking, in real life, we do not anticipate the DOB to be correlated to the street name. It should be noted, however, that the present invention functions even if this assumption is not true, and certain fields are correlated. Equation 1, representing the likelihood ratio, can be rewritten as:

$$\begin{aligned}LR = & P(\text{pattern}_1 | R_i \text{ and } R_j \text{ match}) * \ldots * \\ & P(\text{pattern}_k | R_i \text{ and } R_j \text{ match}) / \\ & P(\text{pattern}_1 | R_i \text{ and } R_j \text{ don't match}) * \ldots * \\ & P(\text{pattern}_k | R_i \text{ and } R_j \text{ don't match}) \\ = & [P(\text{pattern}_1 | R_i \text{ and } R_j \text{ match}) / \\ & P(\text{pattern}_1 | R_i \text{ and } R_j \text{ don't match})] * \ldots * \\ & [P(\text{pattern}_k | R_i \text{ and } R_j \text{ match}) / \\ & P(\text{pattern}_k | R_i \text{ and } R_j \text{ don't match})]\end{aligned} \quad \text{(Eq. 2)}$$

For ease of analysis, it is customary to work with the log of the LR computed in equation 2. Using the log of the LR, equation 3 (Eq. 3) is provided, as shown below.

$$\log(LR) = \log(P(\text{pattern}_1 | R_i \text{ and } R_j \text{ match})/P(\text{pattern}_1 | R_i \text{ and } R_j \text{ don't match})) + \ldots + \log(P(\text{pattern}_k | R_i \text{ and } R_j \text{ match})/P(\text{pattern}_k | R_i \text{ and } R_j \text{ don't match})) \quad \text{(Eq. 3)}$$

Each of such k terms is represented by a weight. The above computed log(LR) is referred to herein as $W_{total\ weight}$, as it sums the k weight terms.

There are several ways to select the patterns and compute each of the k weight terms for record linkage. Examining the training file directly, using weights from prior linkages, and theoretically determining what should be the weights in a typical distribution of units are some examples of techniques that my be used to select the patterns and compute each of the k weight terms for record linkage. One approach is to analyze the data directly. When analyzing a training file, for example, the match status of all or a representative sample of records in the cross product is examined. For this sample, the true match status regarding any two records should be obtained. Patterns and weights can be set: patterns should be found to force weights for matching records when patterns agree to be higher. Weights for non-matching records in the sample should be lower, and patterns should be found so that non-matching units disagree. The result is the improvement of matching. With high weights indicating matches and low weights indicating non-matches, the above construction allows for better identification of matches versus non-matches.

During matching, $W_{total\ weight}$, comprised of all the weights, is compared to a threshold, which is set as described below. If $W_{total\ weight}$ equals or exceeds the threshold, the system will consider the two records a match. If $W_{total\ weight}$ falls below the threshold, the pair will be deemed a non-match. In more sophisticated record linkage approaches, two thresholds may be used. When $W_{total\ weight} \geq$ Upper Threshold, the record pair is deemed a match. When $W_{total\ weight} \leq$ Lower Threshold, the record pair is considered a non-match. For simplicity of exposition, the present description does not describe using the dual-threshold model. It should be noted, however, that the present invention and results are generalizable to a dual-threshold model.

The threshold is set to maximize the usefulness of the linkage. Four outcomes are possible when determining match status of two file records: true positive, false positive, true negative, and false negative. The false negatives and false positives arise due to errors or the natural distribution of field values. For example, two different people can have the same date of birth (DOB). If DOB is a comparison field and other comparison fields for these two individuals do not produce appropriate weights low enough, the equality of the DOB may create a false positive if the DOB weight is high enough to make the $W_{total\ weight}$ higher than the threshold. As a result, the two different people will be falsely labeled a match. A utility could be assigned to each of the four outcomes above and a threshold could be computed which maximizes total system utility. Practically, the threshold may be set by examining the cross product in the training file and assessing the type of errors that can be tolerated by the application.

If the intent is to avoid false negatives, the threshold should be set to a low $W_{total\ weight}$. Matching records should have weights above that cutoff as patterns were chosen to create higher weights. Alternatively, if the intent is to have no false positives, the threshold should be set high. Weights for non-matching records should be lower than that threshold, as patterns were chosen to create lower weights for non-matching records. In the present single-threshold system the threshold is arbitrarily defined as halfway between the maximum and minimum weights for compared fields. The present implementation may generate some false positives and some false negatives. The total weights of some matching units will fall below the threshold, and the weights of some non-matching units will appear as matches. For exemplary and illustration purposes, a simpler threshold is used. It should be noted, however, that in accordance with alternative embodiments of the invention, other choices of thresholds may be used.

Further, in accordance with an alternative embodiment of the invention, greater importance may be attributed to different field weights. Linkage field coefficients, that is, field weight multipliers, may be created that would more optimally interact with a given threshold. Field weights may be multiplied by field coefficients signifying importance to indicate the usefulness of a particular field. However, the patterns themselves may be constructed to create appropriate field weights to optimize field relationships to thresholds. Since weights are constructed based on patterns, the pattern itself can be chosen to create the needed weight importance. Importance can be specified by creating multiple similar patterns, patterns based on individual characters analogous to patterns encompassing full fields, and similar constructions, creating multiple weights for a field. The diversity of weights, instead of using fixed coefficients, may offer more flexibility in constructing field weights to optimize matching.

Once the linkage system 10 is trained it can be run on validated data. The field weights and threshold computed above are used for matching. The same process is followed as above with respect to computing $W_{total\ weight}$ and comparing it to a threshold to determine match status of a validation record pair in a validation file.

The following describes the process of selecting fields for linkage of records. Assuming an error rate for linkage identifiers that is not significant, a single weight may be computed by equation 4, as is shown below.

$$\log(P(pattern_q | R_i \text{ and } R_j \text{ match})/P(pattern_q | R_i \text{ and } R_j \text{ don't match})) \quad \text{(Eq. 4)}$$

The result of equation 4 will be significantly higher than 1 when $R_i$ and $R_j$ match and $pattern_q$ is the equality pattern. The same units should typically have equal identifiers, creating a high numerator above. Similarly, the above weight will be significantly lower than 1 when $R_i$ and $R_j$ do not match and $pattern_q$ is the inequality pattern. Typically, when units are different, their identifiers will not be equal, creating a much higher denominator above. High and low weights can now be separated.

In accordance with the present invention, it is determined how to select fields to add linkage redundancy to address linkage identifier errors. Imagine records $R_i$ and $R_j$ represent the same unit. However, the comparison fields involved have sufficient error such that their computed $W_{total\ weight}$ is below the threshold. As a result, the linkage system 10 would incorrectly label $R_i$ and $R_j$ a non-match. However, if we can find another field such that its weight pushes $W_{total\ weight}$ above the threshold, the records will properly be designated as a match. Similarly, to fix a false positive, we find another field whose disagreement weight pulls $W_{total\ weight}$ below the threshold to rectify this error.

The following example is provided for exemplary purposes and is used to demonstrate the analysis of the present invention with use of a single linkage field. Specifically, the following describes how several parameters are accessed for each test identifier. Imagine that an existing system uses only a field arbitrarily named $K_1$, also referred to herein as an existing identifier. Assume that the number of character positions in $K_1$ is n1, and each character position has a range of $p_1$ values. For example, $p_1$ would be 10 if each $K_1$ character were a digit ranging 0-9. $K_1$ has an error rate e, in [0,1]. With probability e, $K_1$ is subject to a typo, insertion, missing value or similar errors that can happen to a field. We assume the $K_1$ namespace, $p_1^{n1}$, is large and the error rate is small. Consider field $K_2$, another field available in the records, also referred to herein as a test identifier. The number of character positions in $K_2$ is n2 and each $K_2$ character has a range of $p_2$ values. Assume the $K_2$ namespace, $p_2^{n2}$, is also large. $K_2$ has error rate f. The same types of mistakes can happen to $K_2$ as for $K_1$. Likewise, assume a small $K_2$ error rate. A uniform distribution of all values in the namespaces for $K_1$ and $K_2$ is assumed for simpler presentation, although the present invention works with more complex namespace distributions.

The following addresses whether one or more $K_2$s exist and what characteristics these identifiers must meet to fix the errors created by a system only using $K_1$. Errors are minimized by using redundant data.

It is assumed that the current linkage system 10 compares equality and inequality of full $K_1$ values without any character-level analysis of $K_1$. The weights for the linkage system 10 are computed to understand system operations. The weights are determined theoretically. By computing the likelihood ratios, we see that for this linkage system 10 the agreement weight, representing the equality pattern, and disagreement weight, representing the inequality pattern are:

$$[K_1]W_{agree} = \log(P(R_i[K_1]=R_j[K_1]|R_i \text{ and } R_j \text{ match})/P(R_i[K_1]=R_j[K_1]|R_i \text{ and } R_j \text{ don't match})) \quad \text{(Eq. 5)}$$

$$[K_1]W_{disagree} = \log(P(R_i[K_1]\neq R_j[K_1]|R_i \text{ and } R_j \text{ match})/P(R_i[K_1]\neq R_j[K_1]|R_i \text{ and } R_j \text{ don't match})) \quad \text{(Eq. 6)}$$

Since the overall error rate for $K_1$ is e, we have:

$$P(R_i[K_1]\neq R_j[K_1]|R_i \text{ and } R_j \text{ match}) = e^*(1-e) + e^*(1-e) + e^2 - (e^2)^*(1/p_1)^{n1} \quad \text{(Eq. 7)}$$

The first term on the right represents $R_i[K_1]$ being in error when $R_j[K_1]$ is not in error. The second term represents the opposite event. The third term represents the event when the $K_1$ fields of both records are in error. The last term computes the chance that both fields are in error and, uncommonly, the errors produce identical $K_1$ values. The possibility of two $K_1$ fields randomly equaling is one chance within the size of the namespace, represented by $(1/p)^{n1}$. The full fourth term is subtracted from the third term, $e^2$, since this event quantifies the $K_1$ values of both fields erroneously equaling rather than not as the conditional probability above requires. All of the terms that contain $e^2$ terms can be dropped as e is assumed small. The result is equation 8 (Eq. 8).

$$P(R_i[K_1]\neq R_j[K_1]|R_i \text{ and } R_j \text{ match}) = e-e^2+e-e^2+e^2-(e^2) \\ {}^*(1/p_1)^{n1} P(R_i[K_1]\neq R_j[K_1]|R_i \text{ and } R_j \text{ match}) \approx 2^*e \quad \text{(Eq. 8)}$$

Consequently, $$P(R_i[K_1]=R_j[K_1]|R_i \text{ and } R_j \text{ match}) \approx 1-2^*e \quad \text{(Eq. 9)}$$

On the other hand, $$P(R_i[K_1]=R_j[K_1]|R_i \text{ and } R_j \text{ don't match}) = [2^*e(1-e)^* \\ (1/p)^{n1}] + ((1-e)^2)^*(1/p_1)^{n1} + (e^2)^*(1/p)^{n1} \quad \text{(Eq. 10)}$$

The rightmost $(1/p_1)^{n1}$ term represents the possibility of the $K_1$ fields of two non-matching records equaling when both $K_1$ fields are in error. This is the size of the $K_1$ namespace: one value in each character position in the field randomly being chosen across all characters positions independently. The associated $e^2$ term indicates that a mistake took place in both fields for both of them to be equal erroneously. The middle $(1/p_1)^{n1}$ term represents the possibility of $K_1$ fields of two non-matching records equaling due to the natural distribution of field values, which is again the size of the $K_1$ namespace: one value in each field character position randomly being chosen across all positions independently. Such an occurrence is multiplied by the chance both $K_1$ terms will not be in error, $(1-e)^2$. The leftmost $(1/p_1)^{n1}$ term represents the possibility of $K_1$ of two non-matching records equaling when one $K_1$ can become another only via the error e, which is again the size of the namespace. The e and (1-e) terms signify a mistake occurred in one but not the other field. The factor 2 appears since this can happen for the combination $R_i$ and $R_j$ or the opposite combination event, $R_j$ and $R_i$. Therefore, $$P(R_i[K_1] = R_j[K_1] \mid R_i \text{ and } R_j \text{ don't match}) \quad \text{(Eq. 11)}$$
$$= ((1/p_1)^{n1}) *$$
$$(2*e*(1-e) + (1-e)^2 + e^2)$$
$$= ((1/p_1)^{n1}) * ((1-e) + e)^2$$
$$= ((1/p_1)^{n1}) * (1)^2$$
$$= (1/p_1)^{n1}$$

Consequently, $$P(R_i[K_1] \neq R_j[K_1] \mid R_i \text{ and } R_j \text{ don't match}) = 1 - (1/p_1)^{n1} \approx 1 \quad \text{(Eq. 12)}$$

That is, the second term is negligible when the namespace $p_1^{n1}$ is assumed large. Thus, $$[K_1]W_{agree} \approx \log((1-2*e)/(1/p_1)^{n1}) = \log((p_1^{n1})*(1-2*e)) \quad \text{(Eq. 13)}$$

$$[K_1]W_{disagree} \approx \log((2*e)/1) = \log(2*e) \quad \text{(Eq. 14)}$$

It should be noted that the result of equation 13 is typically a large positive value in actual record linkage systems since it is a log of a term including a large namespace; and the result of equation 14 is usually a negative value, although sometime a small positive value, since it is a log of a term including a small error e. The results of equations 13 and 14 are both typically notably different from 1 to improve matching.

In accordance with the present invention, linkage is improved by using a second field. To reduce linkage errors given a system only using a suboptimal $K_1$, $K_2$ should have a larger namespace or smaller error rate that will create larger weights to reverse $K_1$-generated false negatives and false positives. If $K_1$ is creating a false negative, $K_2$ should push the total weight above a new threshold. $K_2$ should fix the mistake when $R_i[K_2]=R_j[K_2]$ but $R_i[K_1] \neq R_j[K_1]$ when $R_i$ and $R_j$ match. When only $K_1$ was used, such an error would lead to a false negative. Upon encountering $R_i[K_1]$ and $R_j[K_1]$ in a $K_1$-only system, an error in either $K_1$ field would set $W_{total\ weight}$ to $[K_1]W_{disagree}$ and the records would be incorrectly labeled. The threshold for a $K_1$-only system is represented by equation 15 (Eq. 15).

$$T1 = ([K_1]W_{agree} + [K_1]W_{disagree})/2 \quad \text{(Eq. 15)}$$

In a $K_1$-only system we have, $$W_{total\ weight} = [K_1]W_{disagree} < T1 = ([K_1]W_{agree} + [K_1]W_{disagree})/2 \quad \text{(Eq. 16)}$$

The left term would be a low or negative number which would be smaller than the positive value on the right, a positive number plus half of the low or negative term on the left.

For a $K_2$ system, new weights and thresholds are created since the new field, $K_2$, is introduced. $K_2$ parameters are similar to that of a $K_1$-system:

$$[K_2]W_{agree} \approx \log((p_2^{n2})*(1-2*f)) \quad \text{(Eq. 17)}$$

$$[K_2]W_{disagree} \approx \log(2*f) \quad \text{(Eq. 18)}$$

The new threshold is represented by equation 19 (Eq. 19), illustrated below.

$$T2 = ([K_1]W_{agree} + [K_2]W_{agree} + [K_1]W_{disagree} + [K_2]W_{disagree})/2 \quad \text{(Eq. 19)}$$

To fix $K_1$ false negatives, it is required to have, $$W_{total\ weight} = [K_1]W_{disagree} + [K_2]W_{agree} \geq T2 \quad \text{(Eq. 20)}$$

Thus, $K_2$ characteristics should meet equation 20 to fix $K_1$-created false negatives. If $K_1$ is creating false positives, $K_2$ characteristics should meet additional criteria beyond equation 20. Upon encountering $R_j[K_1]=R_j[K_1]$, when the records are a non-match, the $W_{total\ weight}$ would be incorrectly set to $[K_1]W_{agree}$ and the records would be incorrectly labeled a match, where $$W_{total\ weight} = [K_1]W_{agree} \geq T1 = ([K_1]W_{agree} + [K_1]W_{disagree})/2 \quad \text{(Eq. 21)}$$

The left term of equation 21 would be a positive number, which would be higher than the smaller positive value on the right of equation 21. In this case, $K_2$ should create a sufficiently low weight to push the total weight below the threshold. In this case, $W_{total\ weight}$ should be represented as shown by equation 22 (Eq. 22).

$$W_{total\ weight} = [K_1]W_{agree} + [K_2]W_{disagree} < T2 \quad \text{(Eq. 22)}$$

Combining equation 20 and equation 22 results in equation 23 (Eq. 23), $$[K_1]W_{agree} + [K_2]W_{disagree} < T2 \leq [K^1]W_{disagree} + [K_2]W_{agree}$$
$$\rightarrow [K_1]W_{agree} + [K_2]W_{disagree} < [K_1]W_{disagree} + [K_2]W_{agree} \quad \text{(Eq. 23)}$$

Reinstating the original parameters, combining, and exponentiating both sides, results in equation 24 (Eq. 24).

$$\log((p_1^{n1})*(1-2*e)) + \log(2*f) < \log(2*e) + \log((p_2^{n2})*(1-2*f))$$
$$\rightarrow (p_1^{n1})*(1-2*e)*(2*f) < (2*e)*(p_2^{n2})*(1-2*f) \quad \text{(Eq. 24)}$$

Specifically, equation 24 allows for a determination to be made as to whether the error rate of the test identifier is an improved error rate over an error of an existing identifier. Given an e, $p_1$, and n1 associated with $K_1$ we can compute if a given available $K_2$ can correct for $K_1$ errors. $K_2$ has to meet equation 24. We can analyze $K_2$'s parameters when training the linkage system 10. The best $K_2$ among available fields can be chosen to fix the linkage errors or the platform due to only $K_1$. It should be noted that the $K_2$ error rate, f, can be even higher than the error rate for $K_1$, e, as long as its namespace compensates for it and allows $K_2$ to fix $K_1$'s errors.

The following provides a description of how to ensure that $K_2$ is introducing fewer linkage errors than $K_1$. $K_2$ is fixing $K_1$ errors, but ideally it can fix more errors than it introduces in which case overall system linkage would improve. Assuming a $K_2$ field meets equation 24, we check if, (To clarify, in this inequality we are computing: $[(P(R_i[K_2]=R_j[K_2]|R_i \text{ and } R_j \text{ don't match})*[(prob(K_2 \text{ false positive})*P(R_i[K_1] \neq R_j[K_1]|R_i \text{ and } R_j \text{ don't match}))+prob(K_1 \text{ true negative})+(P(R_i[K_2] \neq R_j[K_2]|R_i \text{ and } R_j \text{ match})*(prob(K_2 \text{ false negative})*P(R_i[K_1]=R_j[K_1]|R_i \text{ and } R_j \text{ match}))+prob(K_1 \text{ true positive})+(P(R_i[K_2] \neq R_j[K_2]|R_i \text{ and } R_j \text{ match})*(prob(K_2 \text{ false negative})*P(R_i[K_1] \neq R_j[K_1]|R_i \text{ and } R_j \text{ match}))+prob(K_1 \text{ false negative}))+(P(R_i[K_2]=R_j[K_2]|R_i \text{ and } R_j \text{ don't match})*(prob(K_2 \text{ false positive})*P(R_i[K_1]=R_j[K_1]|R_i \text{ and } R_j \text{ don't match}))]<prob(K_1 \text{ false positive}))]<P(R_i[K_1] \neq R_j[K_1]|R_i \text{ and } R_j \text{ match})+prob(K_1 \text{ false negative})+P(R_i[K_1]=R_j[K_1]|R_i \text{ and } R_j \text{ don't match})prob(K_1 \text{ false positive}))$ (Eq. 25)

The left part of the inequality represents the full linkage errors produced by a $K_1$ and $K_2$ system, while the right part represents the complete errors in a $K_1$-only system. It is desired for the left side to be smaller than the right to create fewer errors. The above inequality is simplified as follows:

$[P(R_i[K_2]=R_j[K_2]|R_i \text{ and } R_j \text{ don't match})*[\text{prob}(K_2 \text{ false positive})*(P(R_i[K_1] \neq R_j[K_1]|R_i \text{ and } R_j \text{ don't match})+(\text{prob}(K_1 \text{ true negative})+P(R_j[K_1]=R_j[K_1]|R_i \text{ and } R_j \text{ don't match}))+\text{prob}(K_1 \text{ false positive}))+P(R_j[K_2] \neq R_j[K_2]|R_i \text{ and } R_j \text{ match})*\text{prob}(K_2 \text{ false negative})*(P(R_i[K_1]=R_j[K_1]|R_i \text{ and } R_j \text{ match})+(\text{prob}(K_1 \text{ true positive})+P(R_i[K_1] \neq R_j[K_1]|R_i \text{ and } R_j \text{ match}))]<\text{prob}(K_1 \text{ false negative})<P(R_i[K_1] \neq R_j[K_1]|R_i \text{ and } R_j \text{ match})+\text{prob}(K_1 \text{ false negative})+P(R_j[K_1]=R_j[K_1]|R_i \text{ and } R_j \text{ don't match})\text{prob}(K_1 \text{ false positive}) \rightarrow [P(R_i[K_2]=R_j[K_2]|R_i \text{ and } R_j \text{ don't match})*(1)+[\text{prob}(K_2 \text{ false positive})*(1)+P(R_i[K_2] \neq R_j[K_2]|R_i \text{ and } R_j \text{ match})*(1)]<\text{prob}(K_2 \text{ false negative})*(1)]<P(R_i[K_1] \neq R_j[K_1]|R_i \text{ and } R_j \text{ match})+\text{prob}(K_1 \text{ false negative})+P(R_j[K_1]=R_j[K_1]|R_i \text{ and } R_j \text{ don't match})\text{prob}(K_1 \text{ false positive}) \rightarrow [P(R_i[K_2]=R_j[K_2]|R_i \text{ and } R_j \text{ don't match})+[\text{prob}(K_2 \text{ false positive})+P(R_i[K_2] \neq R_j[K_2]|R_i \text{ and } R_j \text{ match})]<\text{prob}(K_2 \text{ false negative})]<P(R_j[K_1] \neq R_j[K_1]|R_i \text{ and } R_j \text{ match})+\text{prob}(K_1 \text{ false negative})+P(R_i[K_1]=R_j[K_1]|R_i \text{ and } R_j \text{ don't match})\text{prob}(K_1 \text{ false positive})$ (Eq. 26)

The approximations from equation 8 and equation 11 are inserted for $K_1$ above, and analogous approximations for $K_2$, into equation 26, resulting in equation 27 (Eq. 27). Equation 27 illustrates how it is then determined if the test identifier reduces linkage error.

$$(1/p_2)^{n_2}+2*f<2*e+(1/p_1)^{n_1}$$ (Eq. 27)

The total linkage error rate in a $K_1$-only system is the sum on the right side of equation 27. The $2*e$ term is the error rate when $K_1$ is not equal during a match, while the $(1/p_1)^{n_1}$ term is the error rate when $K_1$ is equal during a non-match. The sum on the left of equation 27 is the equivalent error rate for a $K_2$- and $K_1$-system, using analogous computations as for $K_1$. $K_2$ characteristics are the only characteristics responsible for linkage errors. The values for errors are analogous to those computed for a $K_1$-only system. The $K_2$ field among all candidate $K_2$ fields with the smallest product on the left in the above inequality, should be chosen to maximally overcome identifier errors in the system. In particular, if there are several final test identifier $K_2$s, the following steps may be followed: subtract $(p1^{n_1})*(1-2*e)*(2*f)$ from $(2*e)*(p_2^{n_2})*(1-2*f)$, resulting in a first value; subtract $(1/p_2)^{n_2}+2*f$ from $2*e+(1/p_1)^{n_1}$, resulting in a second value; add the first value and the second value to derive a final test identifier result; repeat the subtracting steps and the adding steps for each final test identifier; and select an ideal identifier by choosing the final test identifier having a largest final test identifier result. The abovementioned shows how, as shown by block 208 of FIG. 2, from one or more final test identifiers, a final test identifier is selected as an ideal identifier if it introduces the lowest number of linkage errors across all final test identifiers.

Figure 3:
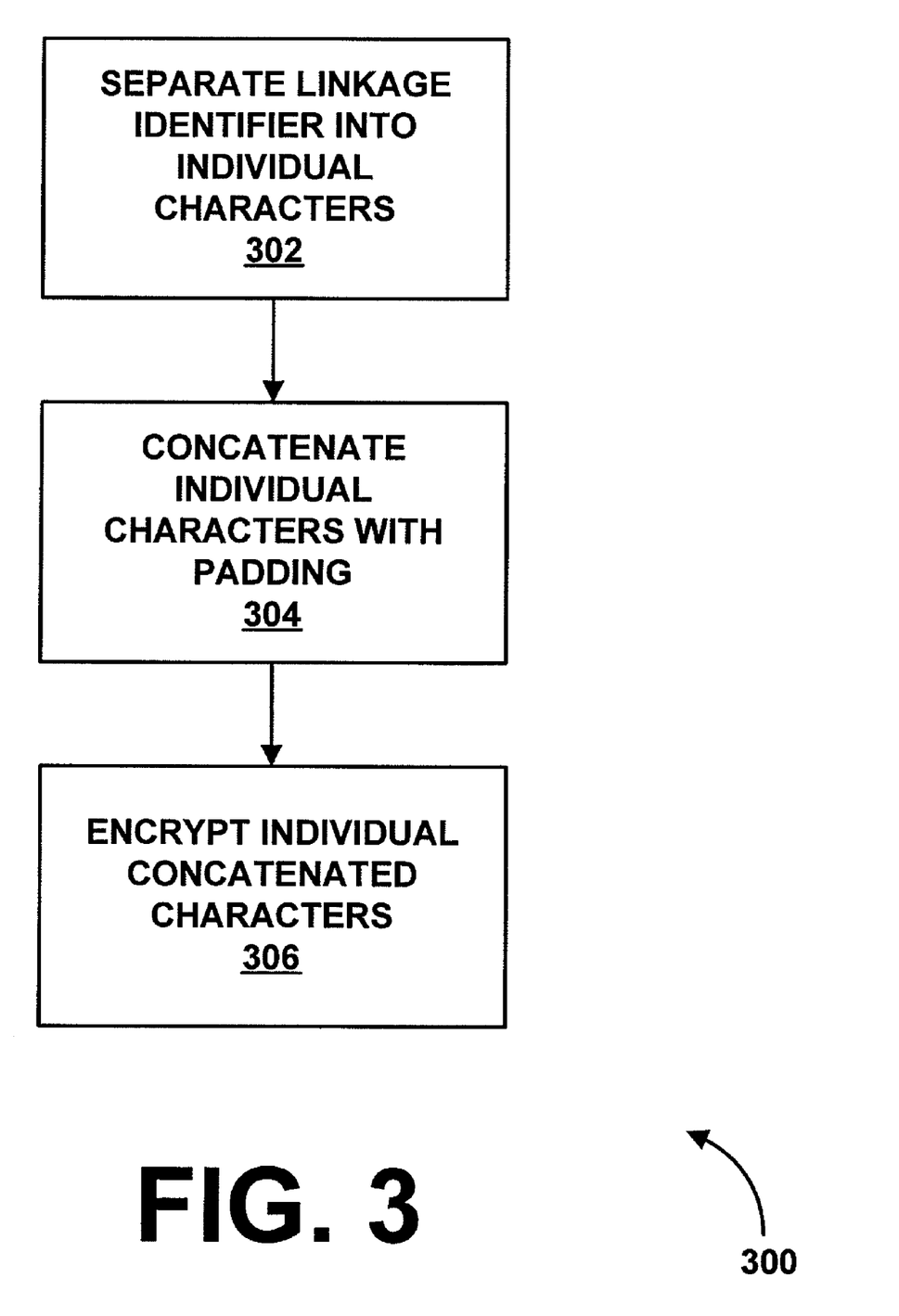
FIG. 3 is a flowchart further illustrating steps performed in securely linking records.

While the abovementioned addresses selection of a linkage variable having fewer errors, the following addresses how to improve security of the record linkage. In summary, the approach used to securely address linkage identifier errors, as is described in detail hereinbelow, encrypts the individual characters to be character-analyzed after concatenating them with padding, which is another field from the same validation record. It should be noted that the padding variable may not only be concatenated with the character, but it may also be XORed with the character. As long as the padding is error-free, any algorithm that compares the equality of individual characters in the compared fields can be implemented in accordance with the present invention. A robust string comparator may be utilized, in accordance with an alternative embodiment of the invention, for example, to compute distance between two fields in spite of deidentification. Equality of enciphered corresponding or non-corresponding characters between two fields may be compared since the enciphered characters should preserve any original plaintext distance relationship The present invention provides for securely linking records, by allowing for privacy preserving character-level analysis of a linkage variable. FIG. 3 is a flowchart 300 further illustrating steps performed in securely linking records by performing character level analysis. As is shown by block 302, linkage identifiers are separated into individual characters. The individual characters are then concatenated with padding (block 304). As is shown by block 306, individual concatenated characters are then encrypted. The following further describes the abovementioned steps in detail.

To provide securely linked records, a security framework is created. In accordance with the present invention, practical realization of attacks within and outside of institutions are used. As an example, with respect to intra-organizational context, i.e. internal attacks, for example, the present invention takes insider threat into account. In insider threat situations, some employees will have access to some of the equipment, personnel, or even some of the data used in the encryption or hashing processes some of the time. The employees may encrypt, decrypt, or hash data to obtain needed information, trying to misuse a cryptographic system. In a real-world known-plaintext attack, for instance, an employee might know how original sensitive data becomes particular encrypted output. The employee might be a business manager who generated such data. The business manager subsequently gives it to an information technology (IT) staff specialist for secure storage. Perhaps the data will be examined later on. The business manager sees the ciphertexts that are created and stored in a data warehouse because the IT expert protects them with encryption, storing them in such a warehouse.

Since the original employee is a business manager he might have access privileges to the data warehouse for operational reasons. To the degree the encryption used by the IT staff specialist is the same as that used by the present record linkage application (perhaps the encryption process is standardized within the organization), the business manager has just conducted a realistic known-plaintext attack. The business manager knows the relationships between some plaintexts and corresponding ciphertexts because he sees the latter in the data warehouse. Other similar attacks within and outside of institutions may happen as well.

The threat, or security, framework of the present invention encompasses several threats that must be guarded against. The first of the several threats is referred to as attacks against encryption (AAE). This threat encompasses attacks such as, a ciphertext only attack, a known-plaintext attack, a chosen-plaintext attack, an adaptive chosen-plaintext attack, a chosen-ciphertext attack, and an adaptive chosen-ciphertext attack, practically realized. The adversary will be an employee running the record linkage software, attempting system compromise. The plaintexts will be the application fields, such as a policy-holder's last name or Social Security Number which could be available in a linkage data set. The ciphertexts will be these encrypted or hashed fields available to the record linkage software and to the employee running it.

Another threat in the security framework which the present system and method also protects against is brute force attacks. Brute force attacks may be divided into a plaintext-brute force attack and key-brute force attack, both of which the present system and method protects. In a plaintext-brute force attack, the adversary investigates every possible plaintext in an attempt to compromise the scheme. The adversary traverses all possible plaintexts in the domain and matches the results to those which have been encrypted or hashed and to which he has access through normal system interactions. For example, in a predictive modeling context, assume medical record numbers (MRN) are to be encrypted. Suppose MRN values are arbitrarily in the range of 0000000000-9999999999. A plaintext-brute force attack is defined as the success an employee has by systematically encrypting 0000000000-9999999999 to see if some enciphered member identifier equals one of the enciphered member identifiers in the data set enciphered using the present scheme, to which the employee has access. If this can be done for all or some of the full original MRNs, or all or some of partial MRNs (i.e., particular character positions), the scheme is insecure.

The key-brute force attack is defined in a similar fashion. The adversary systematically generates all possible keys and encrypts or hashes the known plaintext field values to see if the employee can generate the ciphertext in the data set enciphered using the present scheme to which he has access. The adversary, based on the AAE, should already have some such plaintext and ciphertext pairs, such as from a known-plaintext attack in an intra-organizational context. The adversary can use such data to systematically traverse through all possible keys of a key-based scheme to find the right key.

The present system and method provides a secure approach for meeting the above security and functionality framework. A key-based encryption approach is provided to securely address errors in linkage identifiers. The present system and method provides a general solution that can allows for character-level analysis of one or more fields.

With regard to character-level analysis, the following example is used for illustration. Assume that originally the system is using just one field for linkage and needs to analyze its characters. For example, perhaps if all positions in the identifier are equal but a particular position is not equal, this signifies that the individual is a dependent of the policy-holder. The intent is to link all family-related information. In accordance with the invention, another field in the record is used for padding, as will be described below.

The present system and method provides a scheme involving both fields, permitting character-level analysis of the first field. First, a deterministic key-based encryption algorithm is chosen, which can withstand attacks against encryption (AAE). This same approach should withstand a key-brute force attack. This approach is referred to herein as the foundation algorithm. AES, which can be the basis of deterministic schemes, can be a block cipher meeting these criteria, although subject to the following important caveat. Since ciphertexts are required to be equated, as is shown herein, if block ciphers are used, which can be run in several modes, the block ciphers are run in Electronic Code Book (ECB) mode. Under such usage, the scheme transforms the same plaintexts into the same ciphertexts, allowing for easy equality comparisons. It will be shown hereinbelow how the usage of ECB involving padding will be secure.

The following assumes that we are working with fields $K_1$ and $K_2$, where $K_1$ needs to be character-analyzed. To securely enable character-level analysis, $K_1$ is encrypted in all records (R) before the records reach the validation file. $K_1$ is transformed into a new privacy-preserving data structure, as described below, which in one embodiment of the invention, will be stored in the original $K_1$ location. $K_1$ is then broken into its individual characters.

The following demonstrates how linkage identifiers are separated into individual characters (block 302), how individual characters are then concatenated with padding (block 304), and how individual concatenated characters are then encrypted (block 306). Specifically, if R is a record about to enter the validation file, parse its $K_1$ into $R[K_1][1], R[K_1][2], \ldots, R[K_1][n1]$, where n1 is the number of character positions in $K_1$. Then, concatenate to each $R[K_1][q]$ all of $K_2$, for q=1 ... n1. Each of these plaintexts is then encrypted with the foundation algorithm. The ciphertexts are then linked in a list. $K_1$ is then encrypted with the foundation algorithm. A privacy-protecting data structure is then assembled. The result of the abovementioned is that the data structure contains the encryption of the full $K_1$ identifier and the pointer to the linked list of the identifier's characters padded with $K_2$. The fully encrypted $K_1$ and the head pointer of the linked list is stored in the data structure. The full $K_2$ plaintext is encrypted and the ciphertext is stored in the new $K_2$ privacy-protecting data structure just as for $K_1$.

For exemplary purposes, below is an illustration of the new privacy-protecting data structures for arbitrary record R using foundation algorithm E:

| Before Privacy Enhancement | | |
|---|---|---|
| Rec. | $K_1$ | $K_2$ |
| R | 578 | HL4 |

| After Privacy Enhancement | | |
|---|---|---|
| Rec. | $K_1$ | $K_2$ |
| R | id: E(578)<br>hd: E(5\|HL4)->E(7\|HL4)->E(8\|HL4) | id: E(HL4) |

Each data structure has a component "id" corresponding to the fully encrypted identifier, and the character-level analyzed field(s) has a linked list head ("hd") as shown above.

A record linkage application works with the new field formats. All records in the validation file have been encrypted as shown above. It is assumed that, in one particular matching $(R_i, R_j)$ pair in the validation file, all positions between $R_i[K]$ and $R_j[K]$ are the same except for one, signifying the special dependent status defined above. Also, it is assumed that $R_i[K_2]=R_j[K_2]$. Seeing the privacy-preserving data structures for $K_1$ and $K_2$ in the $R_i$ and $R_j$ validation pair in the validation file, the application begins with $K_1$. The linkage system 10 compares the identifiers. Since $R_i[K_1.id] \neq R_j[K_1.id]$, the two plaintext fields must differ. The linkage system 10 can recognize that $R_i[K_2.id]=R_j[K_2.id]$. Therefore, the linkage system 10 can proceed with trying to determine if the two fields, except for one position, are equal, or if this is a false positive with regard to $K_2$.

The only way the encrypted $K_1$'s would not be equal while the encrypted $K_2$'s would be equal would be if the original $R_i$ and $R_j$ records do not match, and for a mistake to make the original $K_2$ plaintexts of both records equal; or for the $R_i$ and $R_j$ records to match, in which case we would need to surmise if one character position in the original $K_1$ plaintexts differ, which would signify another family member, as before. Of course, if $R_i[K_2]$ or $R_j[K_2]$ is also in error, that is, there is a mistake in one or both $K_2$ fields, no further processing can take place. The pads are in error as the $K_2$ fields are erroneous. As a result, comparisons of the enciphered $K_1$ characters will fail. The present linkage system 10 accesses the linked lists connected with $R_i[K_1]$ and $R_j[K_1]$. The linkage system 10 confirms that each individual character matches except one and properly designates the two records as linking. The belowmentioned illustrates such a comparison for records $R_i$ and $R_j$ using the example above where $K_1$=578 and $K_2$=HL4. Although the last digit of $R_i[K_1]$ is different, the algorithm can still link $R_i$ and $R_j$:

| Rec. | $K_1$ | $K_2$ |
|---|---|---|
| $R_i$ | id: E(572) | id: E(HL4) |
|  | hd: E(5\|HL4)->E(7\|HL4)->E(2\|HL4) | |
| $R_j$ | id: E(578) | id: E(HL4) |
|  | hd: E(5\|HL4)->E(7\|HL4)->E(8\|HL4) | |

Other fields can also be securely analyzed character-by-character, if needed, as described above.

The abovementioned approach meets security and functionality framework requirements. First, exposing a field's characters remains secure from AAE threats due to the padding. Once the employee is examining the data set enciphered by the proposed scheme, surmising individual characters by recognizing their distribution in across various records—a ciphertext-only attack—would be unsuccessful. Since the padding identifier is the same for identical units but different across different units across all their records, the resulting character ciphertexts are much more distributed across all records. All the other AAE threats, beyond the ciphertext-only attack, can lead to the case where some number of records and their corresponding transformed privacy-protecting data structures become known. Without padding, the employee could easily find other enciphered characters among all the records that were not part of the original data available via the AAE attacks. Other deterministically encrypted characters in other records will equal the encrypted positions of known records because characters making up an identifier will probably be chosen from a relatively limited set of values. Padding, in accordance with the present invention, stops such a vulnerability. The individual characters are the same for the same unit but different for all others, preventing any relationship to be surmised among the enciphered characters.

A plaintext-brute force attack is not feasible in the present invention because the foundation algorithm was chosen to be secure against a key-brute force attack. Since the right key for the present key-based scheme cannot be found, systematically going through all the plaintexts and generating the right ciphertexts is not possible.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A method for selecting an ideal identifier, from a series of test identifiers, for linking more than one associated record, comprising the steps of:
    accessing several parameters for each test identifier;
    determining if an error rate of said test identifier is an improved error rate over an error rate of an existing identifier;
    determining if said test identifier reduces linkage error; and
    selecting said test identifier as said ideal identifier if said test identifier has a lower overall error rate, as determined by said steps of determining if an error rate of said test identifier is an improved error rate over an error rate of an existing identifier and determining if said test identifier reduces linkage error, compared to other test identifiers;
    wherein said error rate represents a number of times that said test identifier was incorrect within a statistically meaningful sample of said test identifiers.

2. The method of claim 1, wherein said parameters are selected from the group consisting of a number of character positions in said identifier, a range of each character position, and an error rate of said test identifier.

3. The method of claim 2 wherein said error rate has been previously determined.

4. The method of claim 1, wherein said step of determining if an error rate of said test identifier is an improved error rate over an error rate of an existing identifier is performed by using the equation $(p1^{n1})*(1-2*e)*(2*f)<(2*e)*(p_2^{n2})*(1-2*f)$, where p1 is a range of characters within a character position of said existing identifier, n1 is a number of character positions within said existing identifier, p2 is a range of characters within a character position of said test identifier, n2 is a number of character positions within said test identifier, e is an overall error rate of the existing identifier, and f is an overall error rate of said test identifier.

5. The method of claim 1, where said step of determining if said test identifier reduces linkage error is performed by using the equation $(1/p_2)^{n2}+2*f<2*e+(1/p1)^{n1}$, where p1 is a range of characters within a character position of said existing identifier, n1 is a number of character positions within said existing identifier, p2 is a range of characters within a character position of said test identifier, n2 is a number of character positions within said test identifier, e is an overall error rate of the existing identifier, and f is an overall error rate of said test identifier.

6. The method of claim 1, further defined by:
    said step of determining if an error rate of said test identifier is an improved error rate over an error rate of an existing identifier being performed by using a first equation $(p1^{n1})*(1-2*e)*(2*f)<(2*e)*(p_2^{n2})*(1-2*f)$; and
    said step of determining if said test identifier reduces linkage error being performed by using a second equation $(1/p_2)^{n2}+2f<2*e+(1/p1^{n1})$, where p1 is a range of characters within a character position of said existing identifier, n1 is a number of character positions within said existing identifier, p2 is a range of characters within a character position of said test identifier, n2 is a number of character positions within said test identifier, e is an overall error rate of the existing identifier, and f is an overall error rate of said test identifier.

7. The method of claim 6, wherein if there is more than one test identifier, said method further comprises the step of:
    subtracting $(p1^{n1})*(1-2*e)*(2*f)$ from $(2*e)*(p_2^{n2})*(1-2*f)$, resulting in a first value;
    subtracting $(1/p_2)^{n2}+2*f$ from $2*e+(1/p1)^{n1}$, resulting in a second value;
    adding the first value and the second value to derive a test identifier result;
    repeating said subtracting steps and said adding step for each test identifier; and
    selecting an ideal identifier by choosing the test identifier having the largest test identifier results compared to other test identifier results.

8. A method for providing character level analysis of an identifier within a series of records, while maintaining privacy of characters, to improve security and linkage of associated records, said method comprising the steps of:
- identifying a first identifier within said series of records for analyzing at a character level;
- selecting a second identifier for purposes of padding characters of the first identifier;
- sectioning said first identifier into characters;
- padding each character of the first identifier with the second identifier, resulting is a padded character; and
- encrypting each padded character with a secure deterministic function.

9. The method of claim 8, wherein said step of sectioning said first identifier into characters is further defined as sectioning said first identifier into individual characters.

10. The method of claim 8, wherein said step of sectioning said first identifier into characters is further defined as sectioning said first identifier into one or more subset of characters.

11. The method of claim 8, wherein said step of selecting said second identifier further comprises the step of selecting an identifier that has the same value for said associated records and a different value for unassociated records.

12. The method of claim 8, wherein said step of selecting said second identifier further comprises the step of creating said second identifier from more than one identifier, where said second identifier has the same value for said associated records and a different value for unassociated records.

13. The method of claim 12, wherein said step of creating said second identifier is selected from the group consisting of concatenation and using an XOR.

14. The method of claim 8, wherein said secure deterministic function is a secure deterministic encryption function.

* * * * *